United States Patent
Hahn et al.

(10) Patent No.: US 12,234,591 B2
(45) Date of Patent: Feb. 25, 2025

(54) WASHING MACHINE AND METHOD FOR PROVIDING NOTIFICATION THEREOF

(71) Applicant: Samsung Electronics Co., Ltd., Suwon-si (KR)

(72) Inventors: Jeongwon Hahn, Suwon-si (KR); Romon Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/629,718

(22) Filed: Apr. 8, 2024

(65) Prior Publication Data
US 2024/0254672 A1    Aug. 1, 2024

Related U.S. Application Data

(62) Division of application No. 17/105,760, filed on Nov. 27, 2020, now Pat. No. 11,970,810.

(30) Foreign Application Priority Data

Nov. 29, 2019   (KR) .................. 10-2019-0157558

(51) Int. Cl.
*D06F 34/04*   (2020.01)
*D06F 33/32*   (2020.01)
(Continued)

(52) U.S. Cl.
CPC .............. *D06F 34/04* (2020.02); *D06F 33/32* (2020.02); *D06F 33/47* (2020.02); *D06F 34/05* (2020.02);
(Continued)

(58) Field of Classification Search
None
See application file for complete search history.

(56) References Cited

U.S. PATENT DOCUMENTS

| 10,760,200 B2 | 9/2020 | Choi et al. |
| 2017/0085706 A1 | 3/2017 | Kim et al. |

(Continued)

FOREIGN PATENT DOCUMENTS

| JP | 2019-024809 A | 2/2019 |
| JP | 6542331 B2 | 7/2019 |

(Continued)

OTHER PUBLICATIONS

International Search Report dated Mar. 9, 2021 in connection with International Patent Application No. PCT/KR2020/017192, 3 pages.

(Continued)

*Primary Examiner* — Levon J Shahinian

(57) ABSTRACT

A washing machine includes communicator, a display, a sensor for detecting a water temperature of residual water of the washing machine, and a processor. When the water temperature is equal to or lower than a first temperature, the processor is configured to receive data regarding a temperature of an area where the washing machine is located from an application server. The processor is configured to transmit the received data regarding the temperature to a data server so that the received data regarding the temperature is transmitted to a user terminal device. When the water temperature is equal to or lower than a temperature that is lower than the first temperature, the processor is configured to display a notification regarding freezing of the washing machine. The processor is configured to transmit the notification to the application server so that the notification is transmitted to the user terminal device.

10 Claims, 14 Drawing Sheets

(51) Int. Cl.
*D06F 33/47* (2020.01)
*D06F 34/05* (2020.01)
*D06F 34/24* (2020.01)
*D06F 34/28* (2020.01)
*D06F 37/42* (2006.01)
*G06Q 50/10* (2012.01)
*G08B 5/22* (2006.01)
*H04L 12/28* (2006.01)
*H04L 67/12* (2022.01)
*H04L 67/306* (2022.01)
*H04M 1/72403* (2021.01)
*H04Q 9/00* (2006.01)
*D06F 101/20* (2020.01)
*D06F 103/16* (2020.01)
*D06F 105/00* (2020.01)
*D06F 105/58* (2020.01)

(52) U.S. Cl.
CPC .............. *D06F 34/24* (2020.02); *D06F 34/28* (2020.02); *D06F 37/42* (2013.01); *G06Q 50/10* (2013.01); *G08B 5/22* (2013.01); *H04L 12/2816* (2013.01); *H04L 12/2825* (2013.01); *H04L 67/12* (2013.01); *H04L 67/306* (2013.01); *H04M 1/72403* (2021.01); *H04Q 9/00* (2013.01); *D06F 2101/20* (2020.02); *D06F 2103/16* (2020.02); *D06F 2105/00* (2020.02); *D06F 2105/58* (2020.02); *H04L 2012/285* (2013.01); *H04Q 2209/40* (2013.01); *H04Q 2209/823* (2013.01); *H04Q 2209/84* (2013.01)

(56) References Cited

U.S. PATENT DOCUMENTS

2020/0374393 A1   11/2020   Kim et al.
2021/0087732 A1   3/2021   Park et al.

FOREIGN PATENT DOCUMENTS

| KR | 10-0713949 B1 | 5/2007 |
| KR | 10-0903141 B1 | 6/2009 |
| KR | 10-2010-0070071 A | 6/2010 |
| KR | 10-1243967 B1 | 3/2013 |
| KR | 10-2014-0074487 A | 6/2014 |
| KR | 10-2016-0000782 A | 1/2016 |
| KR | 10-2017-0068069 A | 6/2017 |
| KR | 10-2018-0019144 A | 2/2018 |
| KR | 10-2019-0024440 A | 3/2019 |
| KR | 10-2019-0058172 A | 5/2019 |
| KR | 10-2019-0116189 A | 10/2019 |

OTHER PUBLICATIONS

Written Opinion of the International Searching Authority dated Mar. 9, 2021 in connection with International Patent Application No. PCT/KR2020/017192, 5 pages.

Communication of amendment to parts of the Written Opinion of the International Searching Authority dated Mar. 9, 2021 in connection with International Patent Application No. PCT/KR2020/017192, 3 pages.

Request for the Submission of an Opinion dated Nov. 14, 2024, in connection with Korean Application No. 10-2019-0157558, 16 pages.

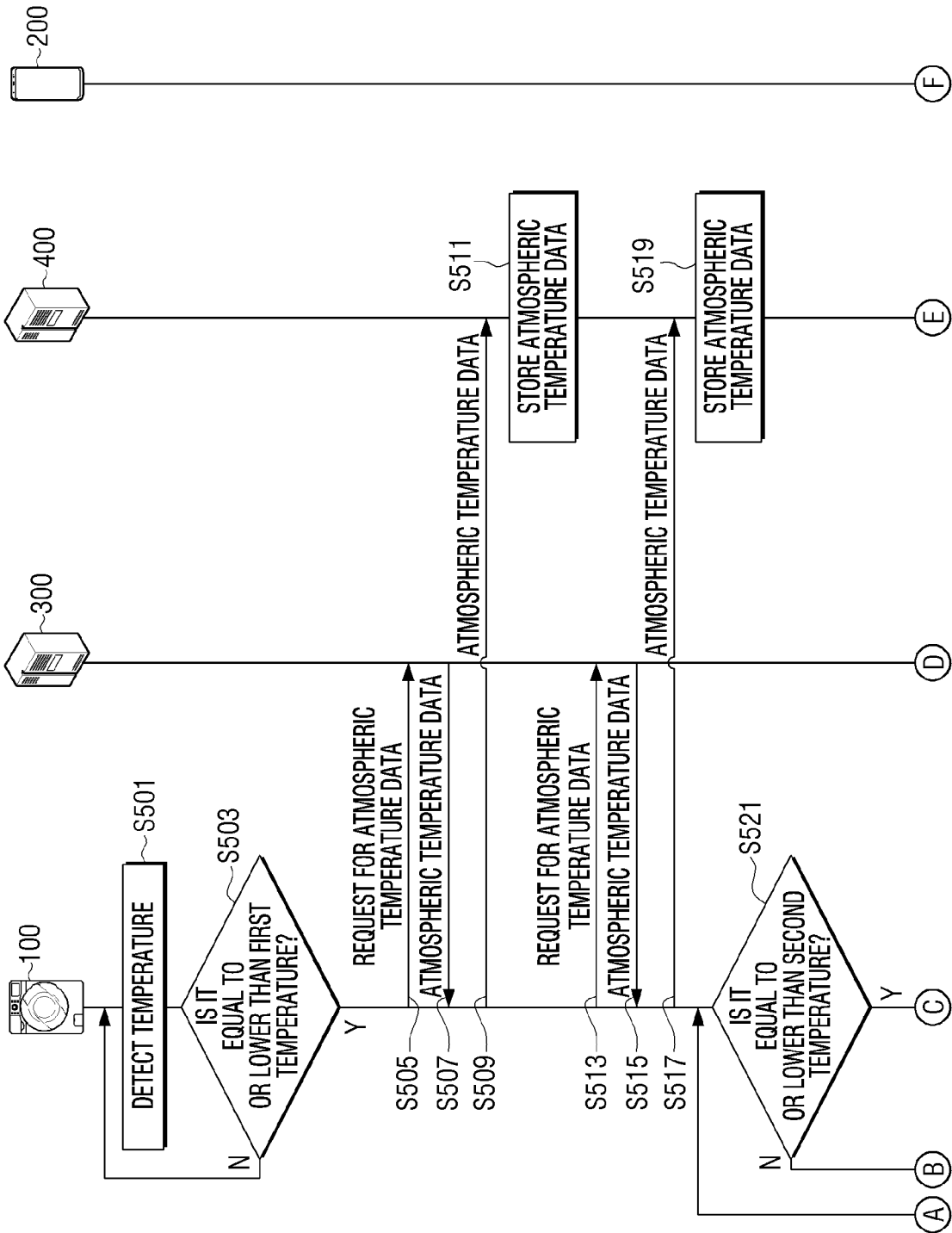

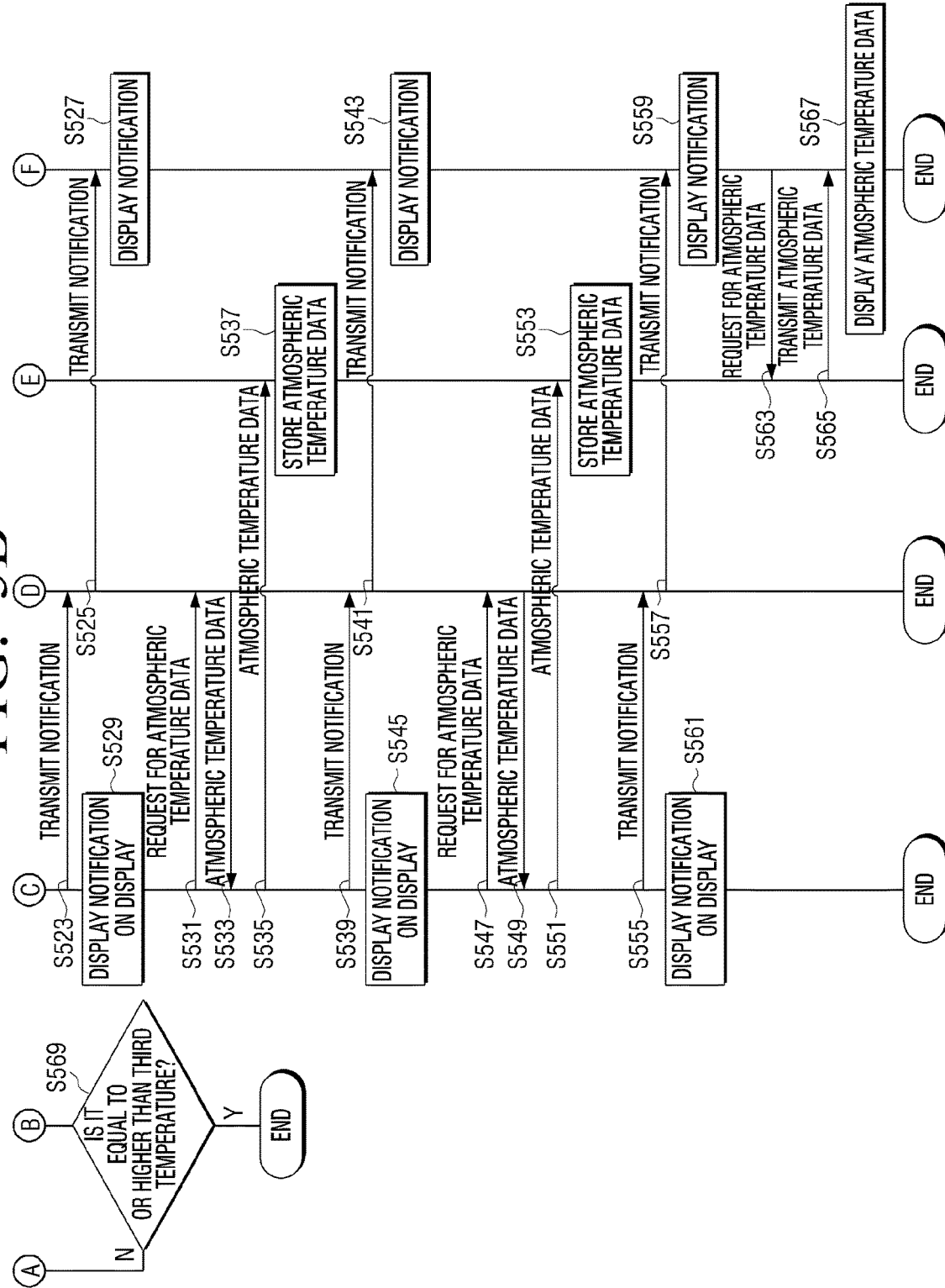

WASHING MACHINE AND METHOD FOR PROVIDING NOTIFICATION THEREOF

CROSS-REFERENCE TO RELATED APPLICATIONS

This application is a divisional of application Ser. No. 17/105,760, filed on Nov. 27, 2020, which is based on and claims priority under 35 U.S.C. § 119 to Korean Patent Application No. 10-2019-0157558, filed on Nov. 29, 2019, in the Korean Intellectual Property Office, the disclosures of which are incorporated by reference herein in their entirety.

BACKGROUND

1. Field

The disclosure relates to a washing machine and a method for providing a notification thereof, and more particularly to a washing machine for providing a notification and a method for providing a notification thereof.

2. Description of Related Art

In general, a washing machine may refer to a device including a tub to be filled with a certain amount of water, and a drum to be installed rotatably in the tub, and may wash laundry by rotation of the drum containing the laundry in the tub and discharge the water in the washing machine outside, when the washing is completed.

In some cases, the water may remain in the washing machine after the washing.

In such a case, there is no significant problem when using the washing machine, but if the washing machine is not used in winter at a low atmospheric temperature, the water remaining in the washing machine may freeze, which may cause malfunction or breakdown of the washing machine.

Accordingly, it is required to research for a method for preventing the washing machine from freezing.

SUMMARY

The disclosure has been made in view of the needs described above and an object thereof is to provide a washing machine which measures a temperature of residual water in the washing machine and, if the remaining water is likely to freeze, notifies it to a user, and a method for providing a notification thereof.

In accordance with an aspect of the disclosure, there is provided a washing machine including a communicator, a display, a sensor for detecting a temperature of residual water of the washing machine, and a processor configured to, based on a temperature detected by the sensor being equal to or lower than a first temperature, receive data regarding a temperature of an area where the washing machine is located from an application server via the communicator, and transmit the received data regarding the temperature to a data server via the communicator so that the received data regarding the temperature is transmitted to a user terminal device by the data server, and based on a temperature detected by the sensor being decreased to be equal to or lower than a second temperature that is lower than the first temperature, control the display to display a notification regarding freezing of the washing machine and transmit the notification to the application server via the communicator so that the notification is transmitted to the user terminal device by the application server.

The data server may be configured to store the data regarding the temperature received from the washing machine, and transmit the stored data regarding the temperature to the user terminal device in response to a request of the user terminal device, and the application server may be configured to, based on the notification being received from the washing machine, transmit the notification to the user terminal device communicating with the application server based on a user account in which the washing machine is registered.

The processor may be configured to, based on a temperature detected by the sensor being equal to or lower than the first temperature, request the application server for the data regarding the temperature a predetermined time interval, receive the data regarding the temperature measured in the area where the washing machine is located from the application server via the communicator in response to the request, and transmit the received data regarding the temperature to the data server via the communicator.

The processor may be configured to request the application server for the data regarding the atmospheric temperature a predetermined time interval, before a temperature equal to or higher than a third temperature that is higher than the first temperature is detected by the sensor.

The processor may be configured to, based on a temperature detected by the sensor in a state where the communicator is deactivated being equal to or lower than the first temperature, activate the communicator, and receive the data regarding the temperature from the application server via the activated communicator.

The processor may be configured to, based on a temperature equal to or higher than a third temperature that is higher than the first temperature being detected by the sensor, deactivate the activated communicator.

The processor may be configured to transmit the notification to the application server by a predetermined number of times a predetermined time interval and display the notification on the display.

The processor may be configured to, based on a temperature detected by the sensor being increased to be equal to or higher than a third temperature that is higher than the second temperature, or a user command for executing an anti-freeze function of the washing machine being input, before the predetermined number of times of notification is provided, stop providing the notification.

The application server may be configured to, based on the washing machine being registered in a plurality of user accounts, determine a user account controlled the washing machine relatively most frequently among the plurality of user accounts, and transmit the notification to the user terminal device communicating with the application server based on the determined user account.

The application server may be configured to, based on the washing machine being registered in a plurality of user accounts, transmit the notification to each of a plurality of user terminal devices communicating with the application server based on each of the plurality of user accounts, and a user terminal device which detects an access point connected to the washing machine or is connected to the access point, among the plurality of user terminal devices, may be configured to display the notification received from the application server.

In accordance with another aspect of the disclosure, there is provided a notification providing method of a washing machine including a sensor for detecting a temperature of residual water, the method including based on a temperature detected by the sensor being determined to be equal to or lower than a first temperature, receiving data regarding a temperature of an area where the washing machine is located from an application server, transmitting the received data regarding the temperature to a data server so that the received data regarding the temperature is transmitted to a user terminal device by the data server, and based on a temperature detected by the sensor being decreased to be equal to or lower than a second temperature that is lower than the first temperature, displaying a notification regarding freezing of the washing machine on a display of the washing machine and transmitting the notification to the application server so that the notification is transmitted to the user terminal device by the application server.

The data server may be configured to store the data regarding the temperature received from the washing machine, and transmit the stored data regarding the temperature to the user terminal device in response to a request of the user terminal device, and the application server may be configured to, based on the notification being received from the washing machine, transmit the notification to the user terminal device communicating with the application server based on a user account in which the washing machine is registered.

The notification providing method according to the aspect of the disclosure, may include, based on a temperature detected by the sensor being equal to or lower than the first temperature, requesting the application server for the data regarding the atmospheric temperature at regular time interval, and the receiving may include receiving the data regarding the atmospheric temperature measured in the area where the washing machine is located from the application server in response to the request.

The requesting may include requesting the application server for the data regarding the atmospheric temperature a predetermined time interval, before a temperature equal to or higher than a third temperature that is higher than the first temperature is detected by the sensor.

The notification providing method according to the aspect of the disclosure may further include, based on a temperature detected by the sensor in a state where a communicator of the washing machine is deactivated being equal to or lower than the first temperature, activating the communicator, and the receiving may include receiving the data regarding the temperature from the application server via the activated communicator.

The notification providing method according to the aspect of the disclosure may further include, based on a temperature equal to or higher than a third temperature that is higher than the first temperature being detected by the sensor, deactivating the activated communicator.

The displaying may include transmitting the notification to the application server by a predetermined number of times a predetermined time interval and displaying the notification on the display.

The notification providing method according to the aspect of the disclosure may further include, based on a temperature detected by the sensor being increased to be equal to or higher than a third temperature that is higher than the second temperature, or a user command for executing an anti-freeze function of the washing machine being input, before the predetermined number of times of notification is provided, stopping providing the notification.

The application server may be configured to, based on the washing machine being registered in a plurality of user accounts, determine a user account controlled the washing machine relatively most frequently among the plurality of user accounts, and transmit the notification to the user terminal device communicating with the application server based on the determined user account.

The application server may be configured to, based on the washing machine being registered in a plurality of user accounts, transmit the notification to each of a plurality of user terminal devices communicating with the application server based on each of the plurality of user accounts, and a user terminal device which detects an access point connected to the washing machine or is connected to the access point, among the plurality of user terminal devices, may be configured to display the notification received from the application server.

According to various aspects of the disclosure, if the washing machine is likely to freeze due to the atmospheric temperature, a user may receive a notification via his/her user terminal device and the display of the washing machine to prevent the washing machine from freezing by taking a suitable action. Therefore, it is possible to prevent breakdown due to the freezing of the washing machine which leads to cost reduction required for repairing the broken parts.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 5A is a sequence diagram illustrating a method for providing a notification according to an embodiment;

FIG. 5B is a sequence diagram illustrating a method for providing a notification according to an embodiment;

DETAILED DESCRIPTION

Figure 1:
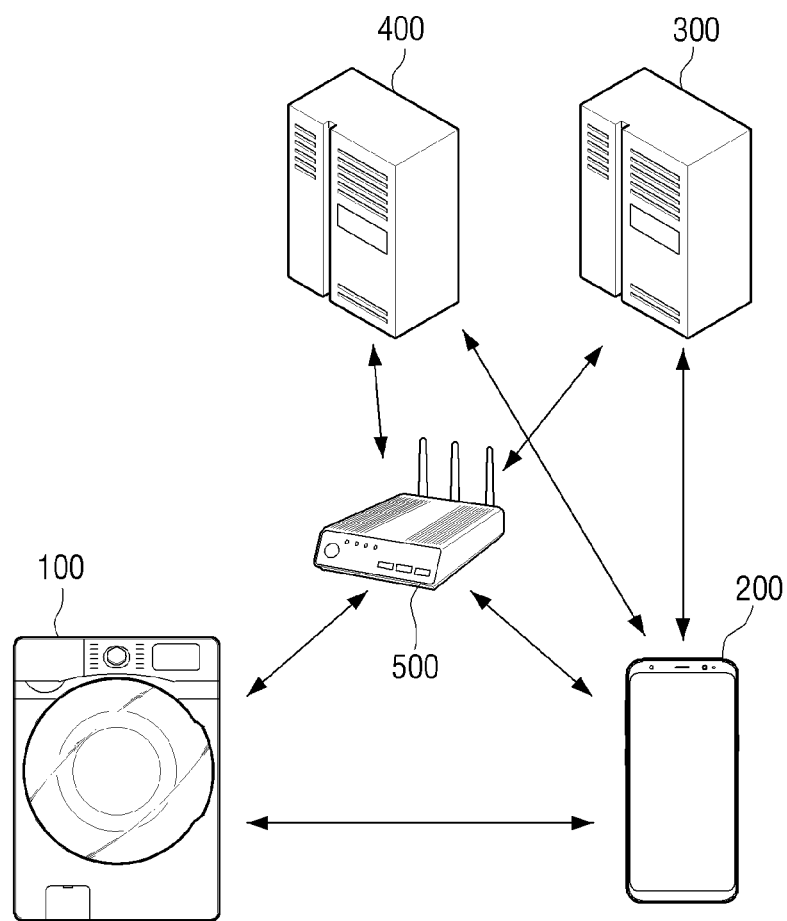
FIG. 1 is a diagram illustrating a system for preventing freezing of a washing machine according to an embodiment.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

FIG. 1 is a diagram illustrating a system for preventing freezing of a washing machine according to an embodiment.

Referring to FIG. 1, a system 1000 may include a washing machine 100, a user terminal device 200, an application server 300, and a data server 400.

The washing machine 100 may refer to a device which washes laundry using water and a detergent and dehydrates the wet laundry. In addition, according to an embodiment, the washing machine 100 may also dry dehydrated laundry.

Meanwhile, the washing machine 100 may detect a temperature of the inside of the washing machine 100 using a temperature sensor provided therein, when the detected temperature corresponds to a temperature at which the washing machine 100 is likely to freeze, display a notification thereof on a display provided on the washing machine 100, and transmit the notification to a user terminal device 200 via an application server 300.

In this case, the user terminal device 200 may display the notification received from the application server 300 via an application installed in the user terminal device 200 on a display of the user terminal device 200.

Herein, the freezing of the washing machine 100 may refer to freezing of water remaining in the washing machine 100 (hereinafter, residual water) after the washing machine 100 performs a washing process such as washing, dehydration, and the like and completes the washing process.

Meanwhile, the washing machine 100 may have the residual water remaining in the washing machine 100 after the washing process is completed due to its structure, and in such a case, if a user does not use the washing machine in the winter at a low atmospheric temperature, the residual water may freeze which may cause malfunction or breakdown of the washing machine 100.

Accordingly, the washing machine 100 may detect a temperature of the residual water using a temperature sensor installed at a position where the residual water is likely to present, and provide a notification to a user according to the detected temperature using a display of the washing machine 100 or the user terminal device 200.

In this case, the user may recognize that the washing machine 100 may freeze through the notification, and may execute an anti-freeze function of the washing machine 100 accordingly, to prevent the washing machine 100 from freezing. Herein, the anti-freeze function may refer to a function of supplying and draining water for a certain period of time, in order to prevent the inside of the washing machine 100 from freezing.

Meanwhile, the application server 300 may control and manage various machines (e.g., home appliances, Internet of Things (IoT) devices, and the like) registered on the application server 300. The application server 300 may register a device for each user account.

Specifically, the user terminal device 200 may download and install an application from a server (not illustrated) providing the application. In this case, the user may execute the application on the user terminal device 200, input a user account, and log in the application server 300 through the input user account, and the user terminal device 200 may communicate with the application server 300 based on the logged-in user account.

The user terminal device 200 may communicate with the washing machine 100 operating in an access point (AP) mode and transmit information regarding an access point 500 (i.e., Wi-Fi access point) to the washing machine 100.

For example, the user terminal device 200 may display a list of connectable access points on the display of the user terminal device 200 and transmit information regarding the access point 500 selected by a user command from the list to the washing machine 100.

Meanwhile, the washing machine 100 may communicate with the access point 500 by using information regarding the access point 500 received from the user terminal device 200 and may be connected to the application server 300 via the access point 500.

Accordingly, when the application server 300 is connected to the washing machine 100 via the access point 500, the application server 300 may register the washing machine 100 in the logged-in user account.

Meanwhile, when the washing machine 100 is registered in the user account, the application server 300 may transmit data received from the washing machine 100 to the user terminal device 200 communicating with the application server 300 based on the user account in which the washing machine 100 is registered. In addition, when a control command for the washing machine 100 is received from the user terminal device 200, the application server 300 may transmit the received control command to the washing machine 100.

In this case, the user terminal device 200 implemented as a smartphone, a tablet, or the like may access the application server 300 via the access point 500 or is connected to the application server 300 via a mobile communication network such as LTE, 5G, or the like to transmit a control command for the washing machine 100 to the application server 300 or receive data transmitted by the application server 300 through an application installed on the user terminal device 200.

Meanwhile, the data server 400 may receive data from the washing machine 100 via the access point 500 and store the received data.

In this case, the user terminal device 200 may be connected to the data server 400 via the access point 500 or the mobile communication network to receive data stored in the data server 400 from the data server 400.

Figure 2:
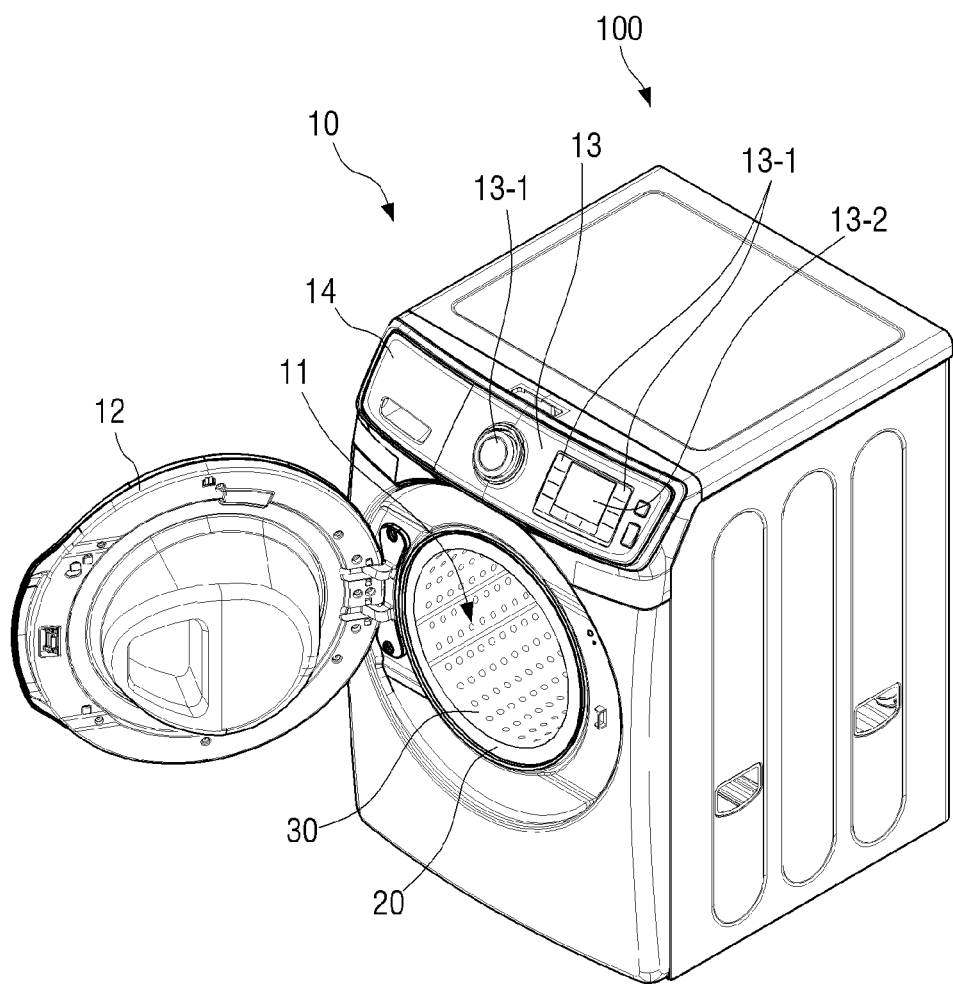
FIG. 2 is a diagram illustrating the washing machine according to an embodiment.

FIG. 2 is a diagram illustrating the washing machine according to an embodiment.

Referring to FIG. 2, the washing machine 100 may include a main body 10, a tub 20, and a drum 30.

The main body 10 may form an appearance of the washing machine 100 and a laundry opening 11 for loading laundry and taking the laundry out of the main body 10 may be provided on a front portion of the main body 10. A door 12 may be installed on the laundry opening 11 to be opened or closed.

In addition, an input interface 13 for receiving a user command for the washing machine 100 may be provided on the front portion of the main body 10. In this case, the input interface 13 may include a plurality of buttons 13-1 for receiving a user command for controlling the washing machine 100 and a display 13-2 for displaying information related to the washing machine 100 and the washing.

The tub 20 may be installed in the main body 10 of the washing machine 100 and formed in a cylindrical shape with an opening formed towards the laundry opening 11. The tub may store a predetermined amount of water necessary for the washing.

The drum 30 may form a space for washing the loaded laundry and may be formed in a cylindrical shape. An opening corresponding to the laundry opening 11 may be provided on the front portion of the drum 30 and the laundry may be loaded to the drum 30 via the opening.

In addition, a plurality of through holes for the water to pass through may be provided on the drum 30. In this case, the water stored in the tub 20 may be introduced into the drum 30 and the water in the drum 30 may leak into the tub 20 through the through holes.

In addition, the drum 30 may rotate by a motor (not illustrated) provided in the washing machine 100. When the drum 30 rotates by the motor (not illustrated), dirt of the laundry loaded into the drum 30 may be removed from the laundry in the process of friction with water stored in the tub 20.

Meanwhile, the washing machine 100 may include a water supply device (not illustrated) for supplying water to the tub 20 (or drum 30). In this case, the water supply device (not illustrated) may include a water supply pipe (not shown) connected to an external water supply source such as a tap, and a water supply valve (not illustrated) for opening and closing the water supply pipe.

In addition, the washing machine 100 may include a detergent container 14 for supplying a detergent, a fabric softener, and the like to the tub 20. When the water supply valve (not illustrated) is opened to supply the water to the water supply pipe (not illustrated), the water is provided to the detergent container 14 and the detergent, the fabric softener, and the like contained in the detergent container 14 may be mixed with water. Accordingly, the water mixed with the detergent, the fabric softener, and the like may be supplied to the tub 20.

In addition, the washing machine 100 may include a draining device (not illustrated) for draining the water stored in the tub 20 to the outside. The draining device (not illustrated) may include a pump (not illustrated) and a drain pipe (not illustrated). In this case, the pump (not illustrated) may discharge the water stored in the tub 20 to the outside of the washing machine 100 via the drain pipe (not illustrated).

Figure 3:
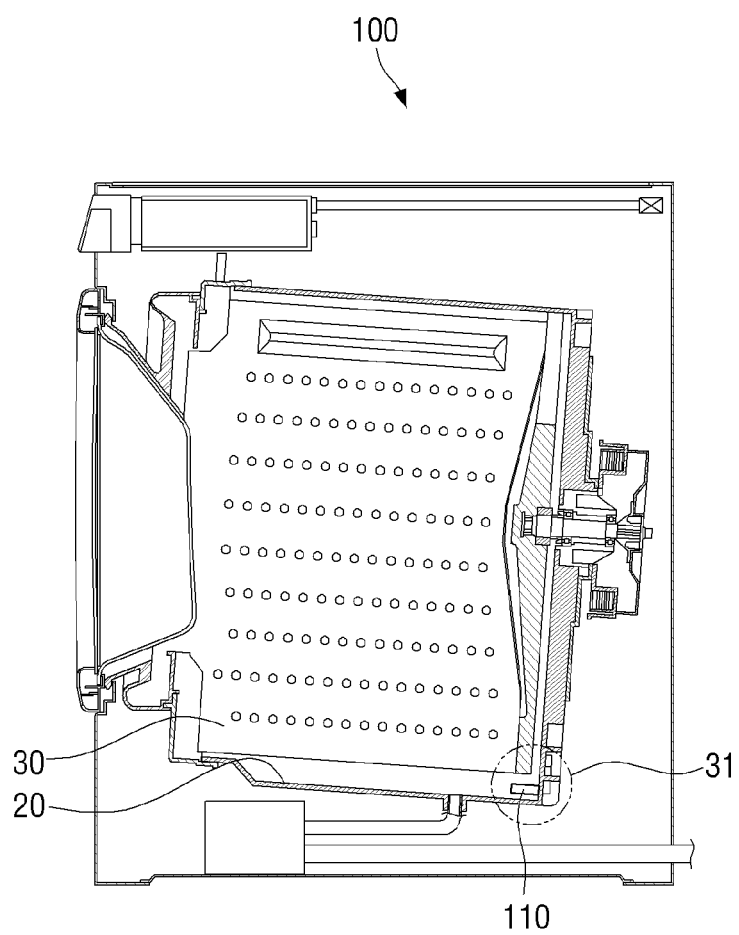
FIG. 3 is a cross-sectional view of the washing machine according to an embodiment.

FIG. 3 is a cross-sectional view of the washing machine according to an embodiment.

FIG. 3 is a diagram illustrating a position of a temperature sensor according to an embodiment and schematically illustrates only elements necessary for description.

Referring to FIG. 3, the tub 20 and the drum 30 may be disposed in the washing machine 100 to tilt at a certain angle so that the opening faces an upper side at the certain angle with respect to a lower frame of the washing machine 100.

Due to such a structure, the residual water may remain in a lower edge area 31 opposite to the opening of the tub 20 and the drum 30. Accordingly, according to an embodiment of the disclosure, a temperature sensor 110 for detecting a temperature of the residual water may be disposed in the area 31.

Figure 4A:
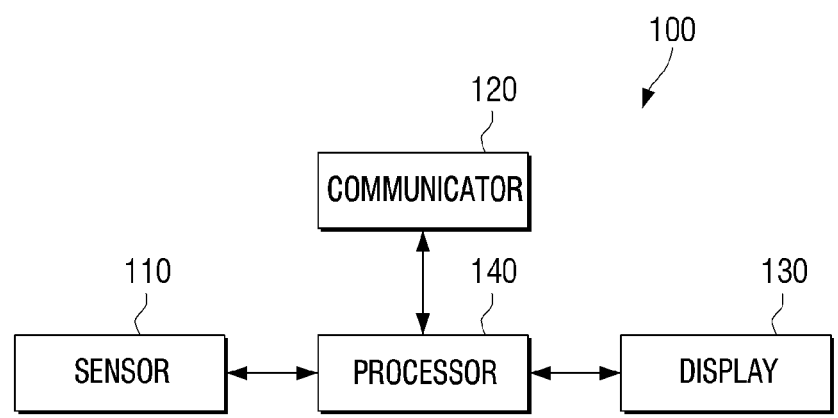
FIG. 4A is a block diagram illustrating a configuration of the washing machine according to an embodiment.

FIG. 4A is a block diagram illustrating a configuration of the washing machine according to an embodiment.

Referring to FIG. 4A, the washing machine 100 may include the sensor 110, a communicator 120, a display 130, and a processor 140.

The sensor 110 may be a temperature sensor which detects a temperature and generates data indicating the detected temperature. In this case, the sensor 110 may detect a temperature of the residual water of the washing machine 100. Specifically, the sensor 110 may be positioned in the lower edge area opposite to the opening of the tub 20 and detect the temperature of the residual water remaining in the washing machine 100 after the washing operation is completed.

The communicator 120 may communicate with various devices. For this, the communicator 120 may include a Wi-Fi chip for Wi-Fi communication.

In this case, the communicator 120 may be connected to the access point 500 to communicate with the user terminal device 200, the application server 300, and the data server 400 via the network.

For example, the communicator 120 may be connected to the access point 500 to communicate with the application server 300 and the data server 400 via the network. In addition, when the communicator 120 is operated in the AP mode, the communicator 120 may communicate with the user terminal device 200 through the network.

The display 130 may display various screens. Specifically, the display 130 may display information regarding the washing machine 100, information regarding the washing operation, and the like, and may also display a notification regarding the freezing of the washing machine 100.

In this case, the display 130 may be implemented as various types of display such as an LCD display, an LED display, and the like and may also be implemented as a touch screen for receiving a user's touch.

Meanwhile, referring to FIG. 2, the display 130 may be provided on a front surface of the main body 10 (such as the display 13-2 of FIG. 2).

The processor 140 may be connected to the sensor 110, the communicator 120, and the display 130 to control the washing machine 100. Specifically, the processor 140 may control general operations and functions of the washing machine 100.

In particular, the processor 140 may provide a notification regarding the freezing of the washing machine 100 based on the temperature detected by the sensor 110.

Hereinafter, a method for providing the notification regarding the freezing by the washing machine 100 will be described in detail with reference to FIGS. 5A and 5B.

First, the sensor 110 may measure a temperature of the inside of the washing machine 100 (S501). Specifically, the sensor 110 may generate data by measuring a temperature at time intervals (e.g., 0.5 seconds) and provide the generated data to the processor 140.

In this case, the sensor 110 may generate the data by measuring the temperature not only in a state where the power of the washing machine 100 is turned on, but also in a state where the power of the washing machine 100 is turned off. Specifically, in a state where the power of the washing machine 100 is turned off, the sensor 110 may generate the data by measuring the temperature by using standby power.

Meanwhile, when it is determined that the temperature detected by the sensor 110 is equal to or lower than a first temperature (S503—Y), the processor 140 may receive data regarding a temperature (or an atmospheric temperature) of an area where the washing machine 100 is located (or temperature data) from the application server 300 via the communicator 120, and may transmit the received data regarding the temperature to the data server 400 via the communicator 120 so that the received data regarding the temperature is transmitted to the user terminal device 200 by the data server 400.

The first temperature herein may be 4° C.

Specifically, when it is determined that the temperature detected by the sensor 110 is equal to or lower than the first temperature, the processor 140 may request the application server 300 for data regarding the temperature at a time interval (S505, S513, S531, and S547), receive the data regarding the temperature measured in the area where the washing machine 100 is located from the application server 300 via the communicator 120 in response to the request (S507, S515, S533, and S549), and transmit the received data regarding the temperature to the data server 400 via the communicator 120 (S509, S517, S535, and S551).

For this, the application server 300 may receive and store the data regarding the temperature measured over time in each area in advance from a Meteorological Agency server (not illustrated) collecting temperatures of each area over time.

Accordingly, when the request is received from the washing machine 100, the application server 300 may transmit the data regarding the temperature measured in the area where the washing machine 100 is located at the time when the request is received to the washing machine 100.

In this case, the application server 300 may receive and store the information regarding the location of the washing machine 100 input to the user terminal device 200 during the process of registering the washing machine 100 from the user terminal device 200 in advance, and determine the area where the washing machine 100 is located based on such information.

Meanwhile, the data server 400 may store the data regarding the temperature received from the washing machine 100 (S511, S519, S537, and S553).

Meanwhile, the processor 140 may request the application server 300 for the data regarding the temperature a predetermined time interval, before a temperature which is equal to or higher than a third temperature is detected by the sensor 110. The third temperature is higher than the first temperature.

The third temperature herein may be 6° C.

In other words, the processor 140 may request the application server 300 for the data regarding the temperature at a predetermined time interval, before the temperature detected by the sensor 110 is increased to be equal to or higher than the third temperature from the detection of the temperature equal to or lower than the first temperature by the sensor 110, and may stop the request for the data regarding the temperature, if the temperature equal to or higher than the third temperature is detected by the sensor 110.

Meanwhile, when it is determined that the temperature detected by the sensor 110 is equal to or lower than the first temperature in a state where the communicator 120 is deactivated, the processor 140 may activate the communicator 120 and receive the data regarding the temperature from the application server 300 via the activated communicator 120.

Specifically, when the power of the washing machine 100 is turned on or a user command for activating the communicator 120 is input, the communicator 120 may be activated. In this case, the processor 140 may receive the data regarding the temperature from the application server 300 via the activated communicator 120.

However, in some cases, in a state where the power of the washing machine 100 is turned off, or although the power of the washing machine is turned on, the communicator 120 may be deactivated according to a user command. In such a state, when the temperature equal to or lower than the first temperature is detected by the sensor 110, the processor 140 may activate the deactivated communicator 120, request the application server 300 for the data regarding the temperature via the activated communicator 120, and receive the data regarding the temperature from the application server 300.

Meanwhile, when the communicator 120 is activated, the processor 140 may deactivate the activated communicator 120 again after providing a notification or when a temperature which is equal to or higher than the third temperature (e.g., 6° C.) is detected by the sensor 110. The third temperature is higher than the first temperature.

As described above, even though the communicator 120 does not keep activated, it is possible to reduce the power consumption, since the deactivated communicator 120 is activated based on the temperature detected by the sensor 110 to receive the temperature data.

Meanwhile, when transmitting the temperature data, the processor 140 may transmit the data detected by the sensor 110 over time to the data server 400 via the communicator 120. In this case, the data server 400 may store the data received from the washing machine 100.

Meanwhile, when the data regarding the temperature is received from the application server 300, the processor 140 may store the received data regarding the temperature to a memory (not illustrated) of the washing machine 100.

Herein, if a storage space of the memory (not illustrated) for storing the data regarding the temperature is not sufficient, the entire data regarding the temperature received from the application server 300 may not be stored in the memory (not illustrated).

In this case, when a storage space of the memory (not illustrated) for storing the atmospheric temperature data to be newly received from the application server 300 is insufficient due to the temperature data stored in advance, the processor 140 may transmit the temperature data stored in the memory (not illustrated) to the data server 400 via the communicator 120 and store the temperature data newly received from the application server 300 in the storage space of the memory (not illustrated) ensured accordingly.

Meanwhile, the data server 400 may transmit the data regarding the temperature received from the washing machine 100 to the user terminal device 200.

Specifically, the data server 400 may store the data regarding the temperature received form the washing machine 100 and transmit the stored data regarding the temperature to the user terminal device 200 in response to the request (S563) of the user terminal device 200 (S565).

In this case, the user terminal device 200 may display the information regarding the temperature of the area where the washing machine 100 is located over time on a display of the user terminal device 200 by using the data regarding the temperature received from the data server 400 (S567).

Meanwhile, when it is determined that the temperature detected by the sensor 110 is decreased to be equal to or lower than the second temperature that is lower than the first temperature (S521—Y), the processor 140 may transmit a notification to the application server 300 via the communicator 120 so that the notification regarding the freezing of the washing machine 100 is transmitted to the user terminal device 200 by the application server 300 and control the display 130 to display the notification.

The notification herein may include a text guiding that the washing machine 100 is likely to freeze due to a low temperature and guiding to execute an anti-freeze function of the washing machine 100 to prevent the washing machine 100 from freezing.

The notification may be transmitted to the application server 300 via the communicator 120, not only when the power of the washing machine 100 is turned on, but also when the power of the washing machine 100 is turned off. Specifically, although the power of the washing machine 100 is turned off, the processor 140 may transmit the notification to the user terminal device 200 via the activated communicator 120.

Meanwhile, when the power of the washing machine 100 is turned on, the processor 140 may display the notification on the display 130.

However, when the power of the washing machine 100 is turned off, the notification may not be provided via the display 130, since the display 130 is also turned off. In this case, the processor 140 may display the notification on the display 130, when the power of the washing machine 100 is turned on according to a user command.

Meanwhile, the second temperature may be 2° C., and the reason for setting the first temperature as 4° C. and the second temperature as 2° C. as described above is as follow.

In general, since the water freezes at a temperature equal to or lower than 0° C., an action is required to be performed before the temperature of the residual water remaining in the washing machine 100 reaches a temperature equal to or lower than 0° C.

In regard to this, first, when the temperature of the residual water is equal to or lower than 4° C., the processor 140 may obtain the temperature of the area where the washing machine 100 is located over time and store this in the data server 400. Then, when the temperature of the residual water is equal to or lower than 2° C., the processor 140 may provide the notification regarding the freezing of the washing machine 100 to the user via the user terminal device 200 and the display 130 to induce the user to perform the action accordingly, since the residual water is highly likely to freeze, when the temperature of the residual water decreases with the lapse of time.

Accordingly, the user who has received the notification may input the user command for executing the anti-freeze function by using at least one of the plurality of buttons 13-1 provided in the washing machine 100.

In this case, the processor 140 may control the washing machine 100 to execute the anti-freeze function according to the user command. Specifically, when the user command for executing the anti-freeze function is input, the processor 140 may control the washing machine 100 to supply and drain water during a certain period of time. Accordingly, the water may circulate the inside of the washing machine 100, thereby preventing the washing machine 100 from freezing.

In addition, the user may receive the data regarding the temperature stored in the data server 400 via the user terminal device 200. In this case, since the data regarding the temperature is a temperature (or an atmospheric temperature) of the area where the washing machine 100 is located over time from when the temperature of the residual water is equal to or lower than 4° C., the user may also obtain information regarding a change of the temperature over time in the area where the washing machine 100 is located.

Meanwhile, the processor 140 may transmit the notification to the application server 300 by a predetermined number of times at time intervals (S523, S539, and S555) and display the notification on the display 130 (S529, S545, and S561).

For example, when the temperature detected by the sensor 110 is equal to or lower than the second temperature, the processor 140 may provide the notification, In this case, the processor 140 may provide the notification three times in total at interval of 30 minutes. However, this is merely an embodiment, and the number of times for providing the notification and the time interval for providing the notification may be variously set.

In this case, when the notification is received from the washing machine 100, the application server 300 may transmit the notification to the user terminal device 200 communicating with the application server 300 based on the user account in which the washing machine 100 is registered (S525, S541, and S557).

Specifically, as described above with reference to FIG. 1, the application server 300 may register the device for each user account during the device registration process. Accordingly, when the notification is received form the washing machine 100, the application server 300 may determine the user account in which the washing machine 100 is registered among a plurality of user accounts, and transmit the notification to the user terminal device 200 communicating with the application server 300 with the determined user account.

In this case, the user terminal device 200 may receive the notification transmitted by the application server 300 via the application installed in the user terminal device 200 and display the notification on the display of the user terminal device 200 via the application (S527, S543, and S559).

Meanwhile, when the third temperature higher than the second temperature is detected by the sensor 110 or the user command for executing the anti-freeze function of the washing machine 100 is input, before the predetermined number of times of the notification is provided, the processor 140 may stop providing the notification.

In other words, although the predetermined number of times of the notification has not provided yet, when the temperature detected by the sensor 110 is increased and determined to be equal to or higher than the third temperature or when the user command for executing the anti-freeze function of the washing machine 100 is input, the processor 140 may stop providing the notification without providing the remaining number of times of the notification.

The third temperature herein may be 6° C. This is because that there is no concern about the freezing of the residual water, when the temperature of the residual water increases or the user executes the anti-freeze function.

Meanwhile, it is described in the above example that the first temperature is 4° C., the second temperature is 2° C., and the third temperature is 6° C., but this is merely an embodiment, and the first to third temperatures may be set as various values close to 0° C. among values equal to or higher than 0° C., within a range satisfying a relationship of relative values between these.

Meanwhile, when the temperature detected by the sensor 110 is the third temperature (e.g., 6° C.) (S569—Y), the processor 140 may end the anti-freeze algorithm descried above.

In other words, as described above, when the temperature equal to or lower than the first temperature is detected by the sensor 110 and then the temperature detected by the sensor 110 increases to be equal to or higher than the third temperature, the processor 140 may stop the request for the atmospheric temperature data, and may deactivate the communicator 120 again, if the deactivated communicator 120 is activated.

Figure 4B:
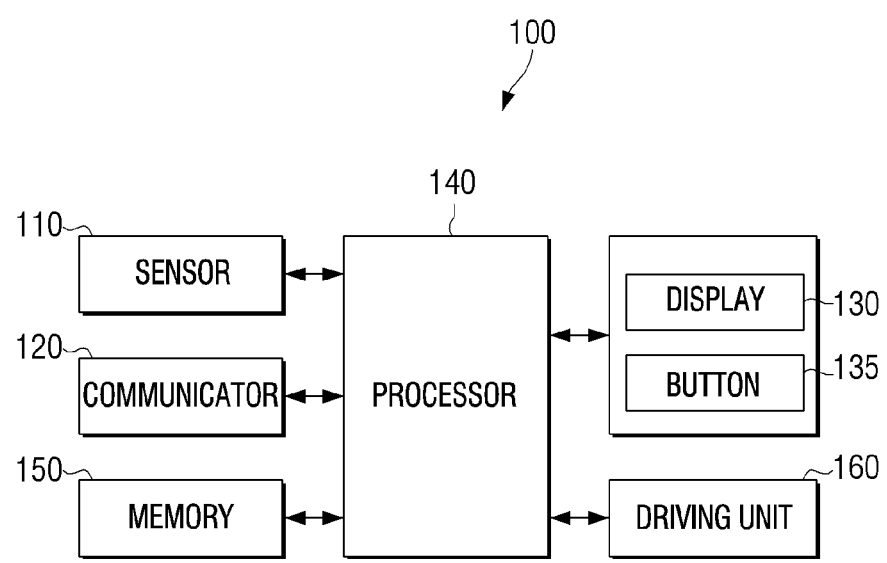
FIG. 4B is a block diagram illustrating a specific configuration of the washing machine according to an embodiment.

FIG. 4B is a block diagram illustrating a specific configuration of the washing machine according to an embodiment.

Referring to FIG. 4B, the washing machine 100 may include the sensor 110, the communicator 120, the display 130, a button 135, a memory 150, and a driving unit 160, and these elements may be controlled by the processor 140.

Meanwhile, the elements illustrated in FIG. 4B are merely an example, and at least some elements may be omitted according to the embodiment.

Meanwhile, the sensor 110, the communicator 120, the display 130, and the processor 140 perform the same function as in FIG. 4A, and therefore the overlapped description regarding these elements will not be repeated.

The button 135 may receive various user commands and transmit the input user commands to the processor 140. For this, the button 135 may include a plurality of buttons provided on the front surface of the washing machine 100 (such as the plurality of buttons 13-1 of FIG. 2). In this case, the processor 140 may control other elements to execute various functions corresponding to the user commands input via the button 135.

The memory 150 may store an instruction or data related to at least another element of the washing machine 100. The memory 150 may be implemented as a non-volatile memory, a volatile memory, a flash memory, a hard disk drive (HDD), or a solid state drive (SSD). The memory 150 may be accessed by the processor 140 and reading, recording, editing, deleting, or updating of the data by the processor 140 may be executed. A term, memory, in the disclosure may include the memory 150, a ROM (not illustrated) and RAM (not illustrated) in the processor 140, or a memory card (not illustrated) (e.g., micro SD card or memory stick) mounted on the washing machine 100.

The driving unit 160 may drive the drum 30 in the washing machine 100. For this, the driving unit 160 may include a motor. In this case, the processor 140 may rotate the drum 30 around a horizontal axis using the motor.

FIGS. 6A to 6D are diagrams illustrating user interfaces displayed on the washing machine and the user terminal device according to embodiments.

Firstly, when it is determined that the temperature detected by the sensor 110 is equal to or lower than the second temperature, the processor 140 may display the notification on the display 130. In this case, referring to FIG. 6A, a notification 610 may include a text of "There is risk of freezing due to low atmospheric temperature. Please execute anti-freeze function".

When it is determined that the temperature detected by the sensor 110 is equal to or lower than the second temperature, the processor 140 may transmit the notification to the application server 300. In this case, the application server 300 may transmit the notification received from the washing machine 100 to the user terminal device 200 communicating with the application server 300 based on the user account in which the washing machine 100 is registered.

In this case, the user terminal device 200 may display the notification received from the application server 300 on the display of the user terminal device 200.

Figure 6A:
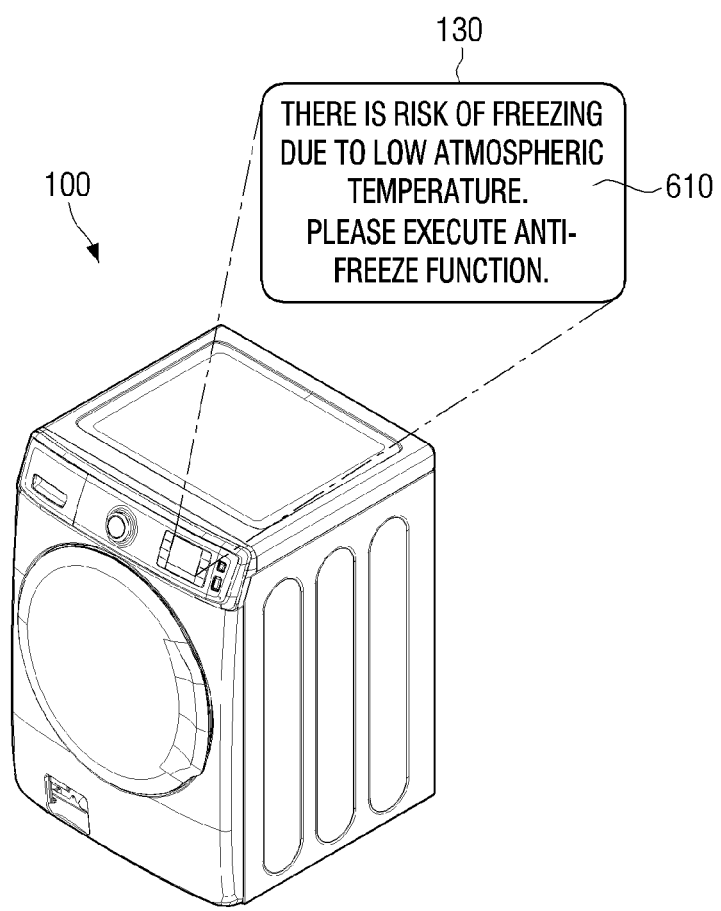
FIG. 6A is a diagram illustrating a user interface provided according to an embodiment.
Figure 6B:
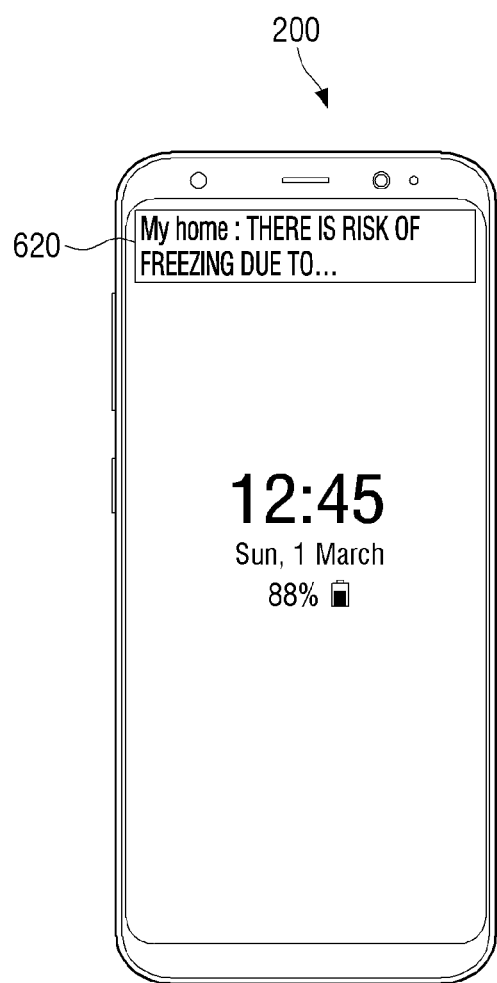
FIG. 6B is a diagram illustrating a user interface provided according to an embodiment.

For example, referring to FIG. 6B, when the user terminal device 200 is locked, the user terminal device 200 (or application installed on the user terminal device 200) may display at least a part of the content of a notification 620 received from the application server 300 in an area of a lock screen.

Figure 6C:
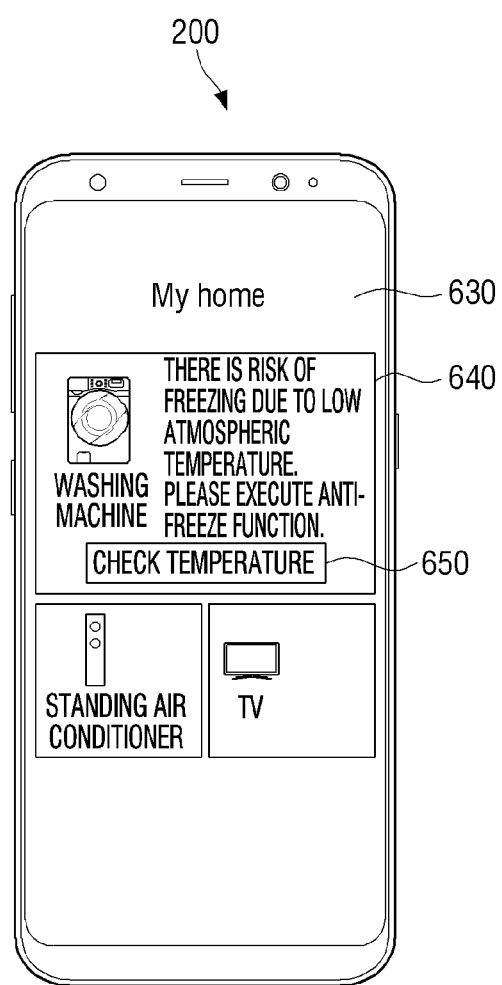
FIG. 6C is a diagram illustrating a user interface provided according to an embodiment.

When a user command for selecting the notification 620 and a user command for unlocking are input, the user terminal device 200 may unlock the user terminal device 200 and display a notification 640 on an execution screen 630 of the application, as illustrated in FIG. 6C.

Meanwhile, the user terminal device 200 may display a GUI 650 for displaying the temperature of the area where the washing machine 100 is located on the execution screen 630.

Accordingly, when the GUI 650 is selected, the user terminal device 200 may request the data server 400 for the temperature data, and, when the temperature data is received from the data server 400, may display the received temperature data.

Figure 6D:
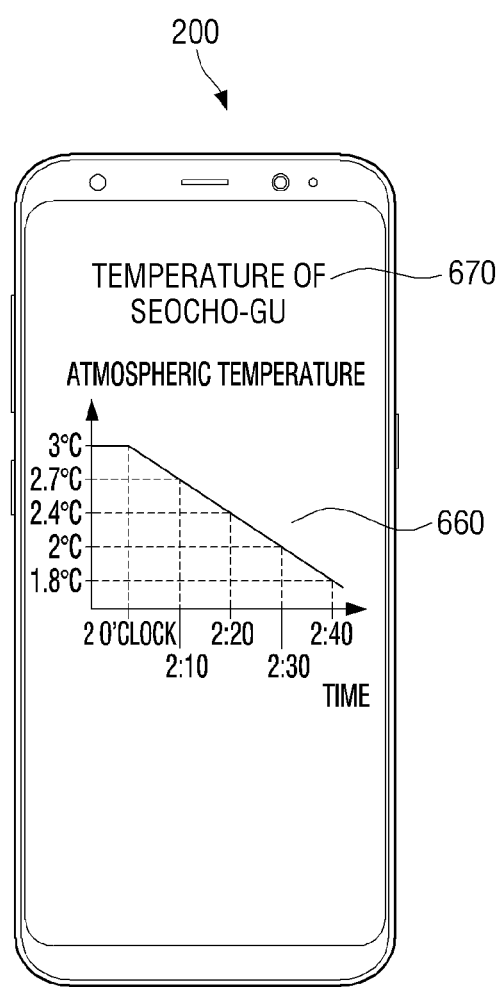
FIG. 6D is a diagram illustrating a user interface provided according to an embodiment.

For example, referring to FIG. 6D, the user terminal device 200 may display the temperature of the area where the washing machine 100 is located over time on the display in a form of a graph 660. In this case, the user terminal device 200 may display information 670 regarding the area where the washing machine 100 is located on the display.

As described above, according to an embodiment of the disclosure, the freezing of the washing machine 100 is more effectively prevented, since the notification regarding the freezing of the washing machine 100 is provided to the user not only through the user terminal device 200, but also through the display 130.

Figure 7:
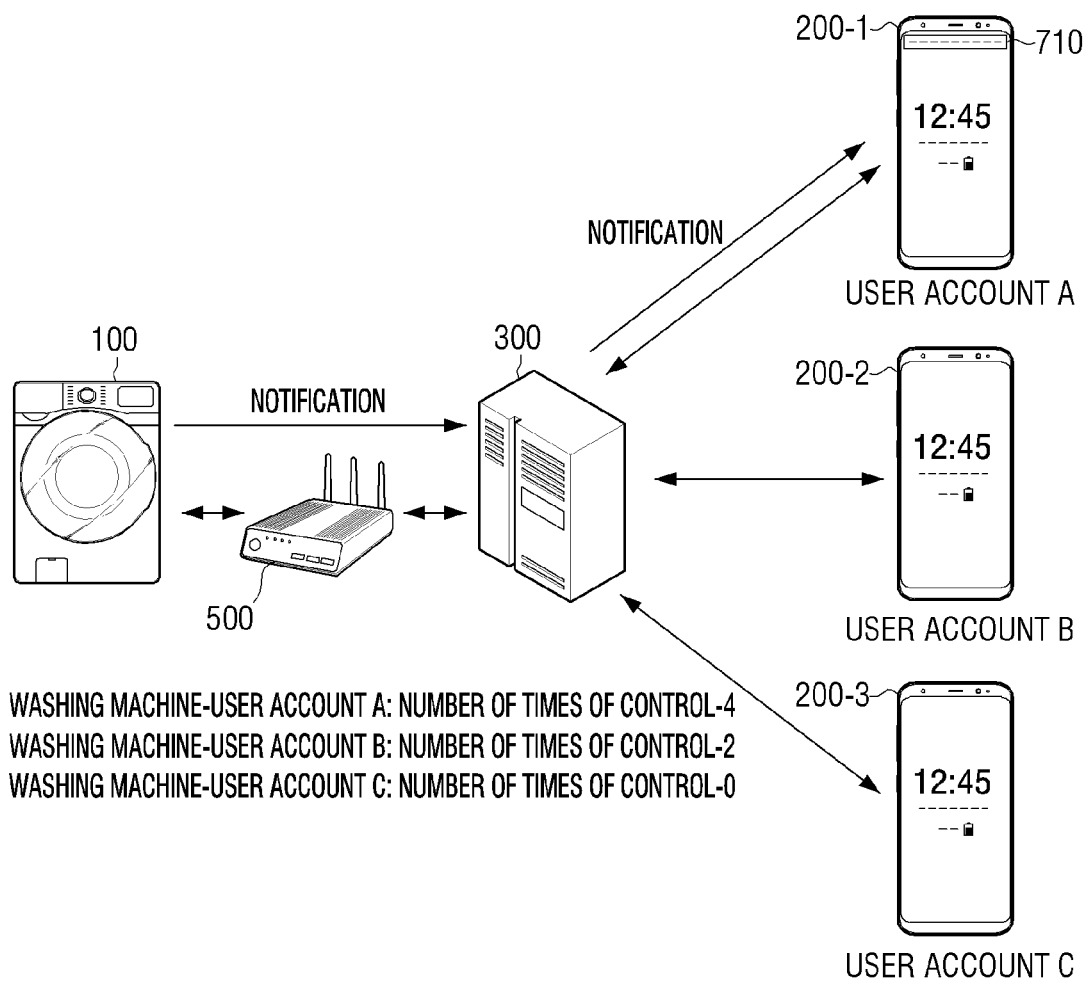
FIG. 7 is a diagram illustrating a method for providing a notification according to an embodiment.
Figure 8:
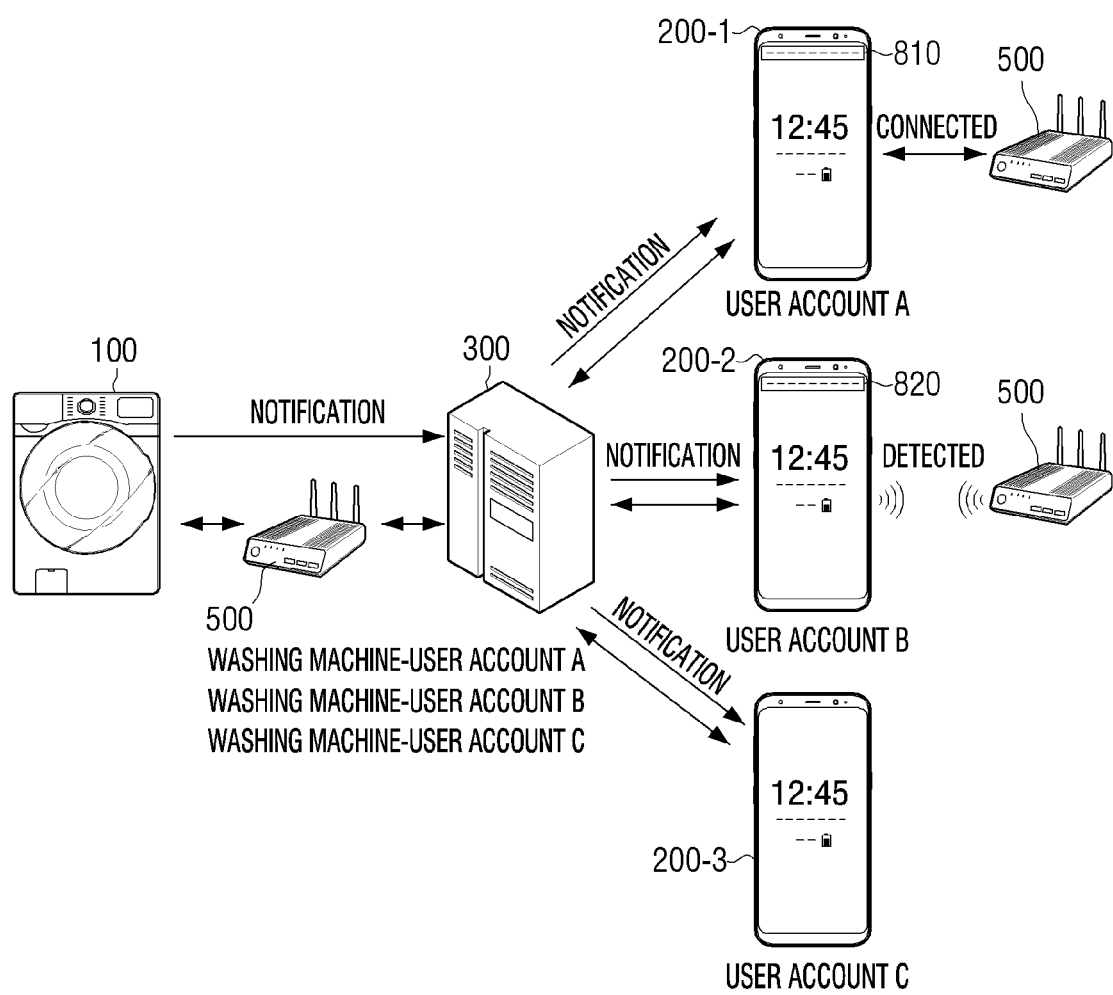
FIG. 8 is a diagram illustrating a method for providing a notification according to an embodiment.

FIGS. 7 and 8 are diagrams illustrating a method for providing a notification according to an embodiment.

As described above, when the notification is received from the washing machine 100, the application server 300 may transmit the notification to the user terminal device 200 communicating with the application server 300 based on the user account in which the washing machine 100 is registered.

In some cases, one washing machine 100 may be registered in a plurality of user accounts.

In such a case where the washing machine 100 is registered in the plurality of user accounts, the application server 300 may determine the user account that controlled the washing machine relatively most frequently among the plurality of user accounts, and transmit the notification to the user terminal device communicating with the application server 300 based on the determined user account.

For this, the application server 300 may count the number of times that the user terminal device accessed the application server 300 via the user account and transmitted the control command to the washing machine 100 and store the information regarding the counted number of times.

For example, referring to FIG. 7, it is assumed that the washing machine 100 is registered in a user account A, a user account B, and a user account C, and the number of times of the transmission of the control command to the washing machine 100 via the user account A is 4, the number of times thereof via the user account B is 2, and the number of times thereof via the user account C is 0.

In this case, when the notification is received from the washing machine 100 via the access point 500, the application server 300 may determine that the washing machine 100 is controlled through the user account A most frequently, among the user accounts A to C in which the washing machine 100 is registered.

Accordingly, the application server 300 may transmit the notification to a user terminal device 200-1 which controlled the washing machine 100 via the application server 300 using the user account A among a plurality of user terminal devices 200-1 to 200-3. In this case, the user terminal device 200-1 may receive the notification from the washing machine 100 and display a notification 710 on a display of the user terminal device 200-1.

This is because the user of the user terminal device which controlled the washing machine 100 most frequently is considered as the user most frequently using the washing machine 100 than other users. Accordingly, the application server 300 may transmit the notification regarding the freezing of the washing machine 100 to the user terminal device controlled the washing machine 100 most frequently. Therefore, it is possible to more effectively prevent the washing machine 100 from freezing.

Meanwhile, when the washing machine 100 is registered in the plurality of user accounts, the application server 300 may transmit the notification to each of the plurality of user terminal devices communicating with the application server 300 based on each of the plurality of user accounts.

In this case, the user terminal device which may detect the access point connected to the washing machine 100 or connected to the access point, among the plurality of user terminal devices, may display the notification received from the application server 300.

For example, referring to FIG. 8, it is assumed that the washing machine 100 is registered in the user account A, the user account B, and the user account C.

In this case, when the notification is received from the washing machine 100 via the access point 500, the application server 300 may transmit the received notification to the plurality of user terminal devices 200-1 to 200-3 communicating with the application server 300 based on the user accounts A to C.

Meanwhile, as described above, the plurality of user terminal devices 200-1 to 200-3 may obtain information regarding the access point 500 connected to the washing machine 100 during the process of registering the washing machine 100 in the application server 300 and may store such information.

Accordingly, when the notification is received from the application server 300, each of the user terminal devices 200-1 to 200-3 may determine whether the access point 500 is present in the surroundings or whether the user terminal device is currently connected to the access point 500, and if the access point 500 is detected or the user terminal device is currently connected to the access point 500, the user terminal device may display the notification received from the application server 300 on the display.

For example, referring to FIG. 8, the user terminal device 200-1 connected to the access point 500 and the user terminal device 200-2 which may detect the access point 500 may display notifications 810 and 820 received from the application server 300 on the display. However, the user terminal device 200-3 not in such a situation may receive the notification from the application server 300 but may not display the received notification.

It is considered that the user terminal device connected to the access point 500 connected to the washing machine 100 or which may detect the access point 500 is in the same space (e.g., home) as the washing machine 100. Accordingly, the user terminal device satisfying such a situation may display the notification received from the application server 300 on the display so that the user around the washing machine 100 may take a suitable action to prevent the washing machine 100 from freezing. Therefore, it is possible to more effectively prevent the washing machine 100 from freezing.

However, the transmission of the notification to the user not in the same space as the washing machine 100 may cause inconvenience, and accordingly, the user terminal device not connected to the access point 500 connected to the washing machine 100 or may not detect the access point 500 does not display the notification, even if the notification is received from the application server 300.

Meanwhile, the application server and the user terminal device may include a processor (not illustrated) and a memory (not illustrated) and may include a communicator (not illustrated) for communicating with other devices using various communication methods.

Accordingly, when the notification is received from the washing machine 100 via the communicator (not illustrated) of the application server 300, the processor (not illustrated) of the application server 300 may transmit the notification to the user terminal device communicating with the application server 300 based on the user account in which the washing machine 100 is registered.

In this case, referring to FIG. 7, the processor (not illustrated) of the application server 300 may determine the user account controlled the washing machine 100 relatively most frequently among the plurality of user accounts, and control the communicator (not illustrated) to transmit the notification to the user terminal device communicating with the application server 300 based on the determined user account.

In addition, when the notification is received from the application server 300 via the communicator (not illustrated) of the user terminal device, the processor (not illustrated) of the user terminal device may display the notification on a display (not illustrated) of the user terminal device.

In this case, referring to FIG. 8, the processor (not illustrated) of the user terminal device may determine whether the access point 500 is present around the user terminal device or the user terminal device is currently connected to the access point 500 using the communicator (not illustrated) of the user terminal device, and if the access point 500 is detected or the user terminal device is connected to the access point 500, the processor (not illustrated) of the user terminal device may display the notification received from the application server 300 on the display (not illustrated) of the user terminal device via an application.

Figure 9:
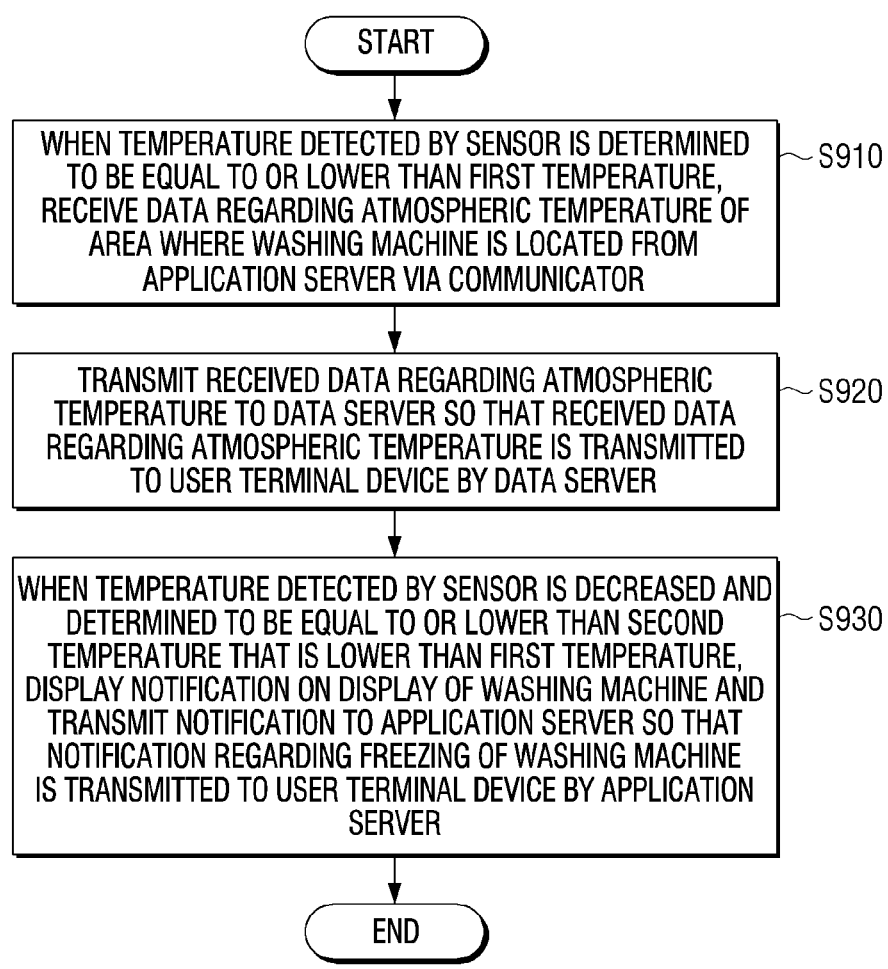
FIG. 9 is a flowchart illustrating a method for providing a notification of a washing machine according to an embodiment.

FIG. 9 is a flowchart illustrating a method for providing an anti-freeze notification of a washing machine according to an embodiment.

In this case, the washing machine may include a sensor for detecting a temperature of residual water.

First, when the temperature detected by the sensor is determined to be equal to or lower than the first temperature, the data regarding the temperature of the area where the washing machine is located may be received from the application server (S910).

Then, the received data regarding the temperature may be transmitted to the data server so that the received data regarding the temperature is transmitted to the user terminal device via the data server (S920).

When the temperature detected by the sensor is decreased and determined to be equal to or lower than the second temperature that is lower than the first temperature, the notification regarding the freezing of the washing machine may be displayed on the display of the washing machine and the notification may be transmitted to the application server so that the notification is transmitted to the user terminal device by the application server (S930).

Herein, the data server may store the data regarding the temperature received from the washing machine and transmit the stored data regarding the temperature to the user terminal device in response to a request of the user terminal device, and when the notification is received form the washing machine, the application server may transmit the notification to the user terminal device communicating with the application server based on the user account in which the washing machine is registered.

Meanwhile, when the temperature detected by the sensor is determined to be equal to or lower than the first temperature, the washing machine may request the application server for the data regarding the temperature at time intervals. In this case, the washing machine may request the application server for the data regarding the temperature a predetermined time interval, before the temperature which is equal to or higher than the third temperature is detected by the sensor. The third temperature is higher than the first temperature.

Meanwhile, in Step S910, the data regarding the temperature measured in the area where the washing machine is located may be received from the application server in response to the request.

In addition, when the temperature detected by the sensor is equal to or lower than the first temperature in a state where the communicator is deactivated, the communicator may be activated. In this case, in Step S910, the data regarding the temperature may be received from the application server via the activated communicator.

In this case, when the temperature equal to or higher than the third temperature is detected by the sensor, the activated communicator may be deactivated. The third temperature is higher than the first temperature.

Meanwhile, in Step S930, the notification may be transmitted to the application server by the predetermined number of times a predetermined time interval and displayed on the display. In this case, when the temperature detected by the sensor is increased to be equal to or higher than the third temperature higher than the second temperature or the user command for executing the anti-freeze function of the washing machine is input, before the predetermined number of times of the notification is provided, the providing the notification may be stopped.

Meanwhile, when the washing machine is registered in the plurality of user accounts, the application server may determine the user account controlled the washing machine relatively most frequently among the plurality of user accounts and transmit the notification to the user terminal device communicating with the application server based on the determined user account.

In addition, when the washing machine is registered in the plurality of user accounts, the application server may transmit the notification to each of the plurality of user terminal devices communicating with the application server based on each of the plurality of user accounts. In this case, the user terminal device which may detect the access point connected to the washing machine or connected to the access point, among the plurality of user terminal devices, may display the notification received from the application server.

Meanwhile, the method for providing the notification regarding the freezing of the washing machine has been described above in detail.

Meanwhile, according to an embodiment of the disclosure, various embodiments of the disclosure may be implemented as software including instructions stored in machine (e.g., computer)-readable storage media. The machine is a device which invokes instructions stored in the storage medium and is operated according to the invoked instructions, and may include a device according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory storage medium" is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., download or upload) through an application store (e.g., PlayStore™) or directly between two user devices (e.g., smartphones). In a case of the on-line distribution, at least a part of the computer program product (e.g., downloadable app) may be at least temporarily stored or temporarily generated in a machine-readable storage medium such as a memory of a server of a manufacturer, a server of an application store, or a relay server.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A notification providing method of a washing machine including a sensor for detecting a temperature of residual water, the method comprising:
    based on a temperature detected by the sensor being determined to be equal to or lower than a first temperature, receiving data regarding a temperature of an area where the washing machine is located from an application server;
    transmitting the received data regarding the temperature to a data server so that the received data regarding the temperature is transmitted to a user terminal device by the data server; and
    based on a temperature detected by the sensor being decreased to be equal to or lower than a second temperature that is lower than the first temperature, displaying a notification regarding freezing of the washing machine on a display of the washing machine and transmitting the notification to the application server so that the notification is transmitted to the user terminal device by the application server.

2. The notification providing method according to claim 1, wherein the data server is configured to store the data regarding the temperature received from the washing machine, and transmit the stored data regarding the temperature to the user terminal device in response to a request of the user terminal device, and
    wherein the application server is configured to, based on the notification being received from the washing machine, transmit the notification to the user terminal device communicating with the application server based on a user account in which the washing machine is registered.

3. The notification providing method according to claim 1, further comprising:
    based on a temperature detected by the sensor being equal to or lower than the first temperature, requesting the application server for the data regarding an atmospheric temperature at a regular time interval,
    wherein the receiving comprises receiving the data regarding the atmospheric temperature measured in the area where the washing machine is located from the application server in response to the request.

4. The notification providing method according to claim 3, wherein the requesting comprises requesting the application server for the data regarding the temperature a predetermined time interval, before a temperature equal to or higher than a third temperature that is higher than the first temperature is detected by the sensor.

5. The notification providing method according to claim 1, further comprising:
    based on a temperature detected by the sensor in a state where a communicator of the washing machine is deactivated being equal to or lower than the first temperature, activating the communicator,
    wherein the receiving comprises receiving the data regarding the temperature from the application server via the activated communicator.

6. The notification providing method according to claim 5, further comprising:
    based on a temperature equal to or higher than a third temperature that is higher than the first temperature being detected by the sensor, deactivating the activated communicator.

7. The notification providing method according to claim 1, wherein the displaying comprises transmitting the notification to the application server by a predetermined number of times a predetermined time interval and displaying the notification on the display.

8. The notification providing method according to claim 7, further comprising:
    based on a temperature detected by the sensor being increased to be equal to or higher than a third temperature that is higher than the second temperature, or a user command for executing an anti-freeze function of the washing machine being input, before the predetermined number of times of notification is provided, stopping providing the notification.

9. The notification providing method according to claim 1, wherein the application server is configured to, based on the washing machine being registered in a plurality of user accounts, determine a user account controlled the washing machine relatively most frequently among the plurality of user accounts, and transmit the notification to the user terminal device communicating with the application server based on the determined user account.

10. The notification providing method according to claim 1, wherein the application server is configured to, based on the washing machine being registered in a plurality of user accounts, transmit the notification to each of a plurality of user terminal devices communicating with the application server based on each of the plurality of user accounts, and wherein a user terminal device which detects an access point connected to the washing machine or is connected to the access point, among the plurality of user terminal devices, is configured to display the notification received from the application server.

* * * * *